United States Patent
Koyama et al.

(10) Patent No.: US 8,514,596 B2
(45) Date of Patent: *Aug. 20, 2013

(54) SYSTEM INTERCONNECTION INVERTER WITH BYPASS PATH

(75) Inventors: Yushi Koyama, Fuchu (JP); Junichi Tsuda, Fuchu (JP); Hiroshi Mochikawa, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 13/127,641

(22) PCT Filed: Jul. 21, 2009

(86) PCT No.: PCT/JP2009/063019
§ 371 (c)(1),
(2), (4) Date: May 4, 2011

(87) PCT Pub. No.: WO2010/055713
PCT Pub. Date: May 20, 2010

(65) Prior Publication Data
US 2011/0216568 A1    Sep. 8, 2011

(30) Foreign Application Priority Data
Nov. 12, 2008 (JP) ................. 2008-289758

(51) Int. Cl.
*H02M 1/12* (2006.01)
*H02M 1/14* (2006.01)

(52) U.S. Cl.
USPC .............. 363/39; 363/40; 363/41; 363/131; 363/132

(58) Field of Classification Search
USPC .................. 363/39, 40, 41, 131, 132
See application file for complete search history.

(56) References Cited

U.S. PATENT DOCUMENTS 5,831,842 A * 11/1998 Ogasawara et al. ............. 363/40
6,452,819 B1 * 9/2002 Wobben ......................... 363/40

(Continued)

FOREIGN PATENT DOCUMENTS

JP 07-087753 A 3/1995
JP 11-235055 A 8/1999

(Continued)

OTHER PUBLICATIONS

"Power Electronics Circuit", Semiconductor Power Conversion System Investigation Expert Committee of the Institute of Electrical Engineers of Japan, Ohm-sha, Nov. 30, 2000, p. 206.

(Continued)

*Primary Examiner* — Bao Q Vu
(74) *Attorney, Agent, or Firm* — Foley & Lardner LLP (57) ABSTRACT

The present invention includes: an inverter 1 configured to perform pulse wide modulation on an output from a DC power source 5; a first capacitor pair 41 provided at an input side of the inverter and including two capacitors serially connected to form a neutral point; a second capacitor pair 42 provided at an output side of the inverter and including two capacitors serially connected to form a neutral point; a bypass path g for a leakage current formed by connecting the neutral point of the first capacitor pair and the neutral point of the second capacitor pair to each other; at least one common mode choke coil 3 provided between the first capacitor pair and the second capacitor pair and configured to suppress a common mode current generated in the inverter; and an output filter 2 configured to convert a voltage, which is outputted from the inverter and subjected to the pulse wide modulation, into a voltage in a sine wave form.

10 Claims, 11 Drawing Sheets

(56) References Cited

U.S. PATENT DOCUMENTS

| | | | |
|---|---|---|---|
| 7,173,832 B2 * | 2/2007 | Wu | 363/40 |
| 7,274,576 B1 * | 9/2007 | Zargari et al. | 363/39 |
| 2005/0174812 A1 * | 8/2005 | Wu | 363/39 |
| 2007/0211501 A1 * | 9/2007 | Zargari et al. | 363/39 |

FOREIGN PATENT DOCUMENTS

| | | | |
|---|---|---|---|
| JP | 2000-224862 A | | 8/2000 |
| JP | 2001069762 A | * | 3/2001 |
| JP | 2002-218656 A | | 8/2002 |
| JP | 2002-238268 A | | 8/2002 |
| JP | 2002-369543 A | | 12/2002 |
| JP | 2004-023825 A | | 1/2004 |
| JP | 2005-204438 A | | 7/2005 |
| JP | 2005204438 A | * | 7/2005 |
| JP | 3805953 B2 | | 5/2006 |
| JP | 2007-068311 A | | 3/2007 |
| JP | 2007-336743 A | | 12/2007 |
| JP | 2009-148078 A | | 7/2009 |
| JP | 2009-148162 A | | 7/2009 |

OTHER PUBLICATIONS

Korean Office Action with English Translation, dated Aug. 29, 2012, 9 pages.

Y. Koyama, U.S. PTO Office Action, U.S. Appl. No. 13/547,552, dated Oct. 4, 2012, 9 pages.

Y. Koyama, U.S. PTO Notice of Allowance, U.S. Appl. No. 13/547,552, dated Feb. 22, 2013, 7 pages.

* cited by examiner

SYSTEM INTERCONNECTION INVERTER WITH BYPASS PATH

TECHNICAL FIELD

The present invention relates to a system interconnection inverter that converts an output of a DC power source into an AC and interconnects the AC obtained by the conversion to a power system of an electrical power supplier, and more specifically, to a technique for suppressing a current due to common mode noise (hereinafter, referred to as "common mode current").

BACKGROUND ART

In a system interconnection inverter that converts an output of a DC power source such as a solar power system or a fuel cell into an AC and interconnects the AC obtained by the conversion to a power system, for example, a leakage current flowing from the system interconnection inverter to the ground has to be suppressed to prevent an electric shock to a person or influence on other devices. An acceptable amount of the leakage current is defined in Electrical Appliances and Material Safety Act. Moreover, a test standard for a system interconnection device of a distributed-type power source is also defined by Japan Electrical Safety & Environment Technology Laboratories.

A solar power system has a floating capacitance between a terminal of a solar cell panel and a frame of the solar cell panel connected to the ground. Generally, an insulating layer made of a glass plate is formed on a surface of the solar cell panel, and the glass plate has a large plane surface. Thus, the floating capacitance increases when the rain wets the glass plate, whereby the leakage current also increases. There are several paths for the leakage current, one of which is a grounding wire of the inverter, for example. Increase in the floating capacity in one of the several paths leads to increase in the leakage current.

General methods for suppressing the leakage current includes a method of insulating the system interconnection inverter from the power system by means of an isolation transformer, and a method of using a common mode choke coil for suppressing the common mode current (see, for example, Non-Patent Document 1). Known methods besides these methods include a method of causing the common mode current to flow to an input side or the ground by bypassing with a filter (see, for example, Patent Document 1 and Non-Patent Document 1), a method of employing a two level pulse wide modulation (PWM) as the control scheme of the inverter and respectively outputting voltages of opposite polarity to upper and lower arms (see Patent Document 2), and a method that is a combination of these.

Figure 1:
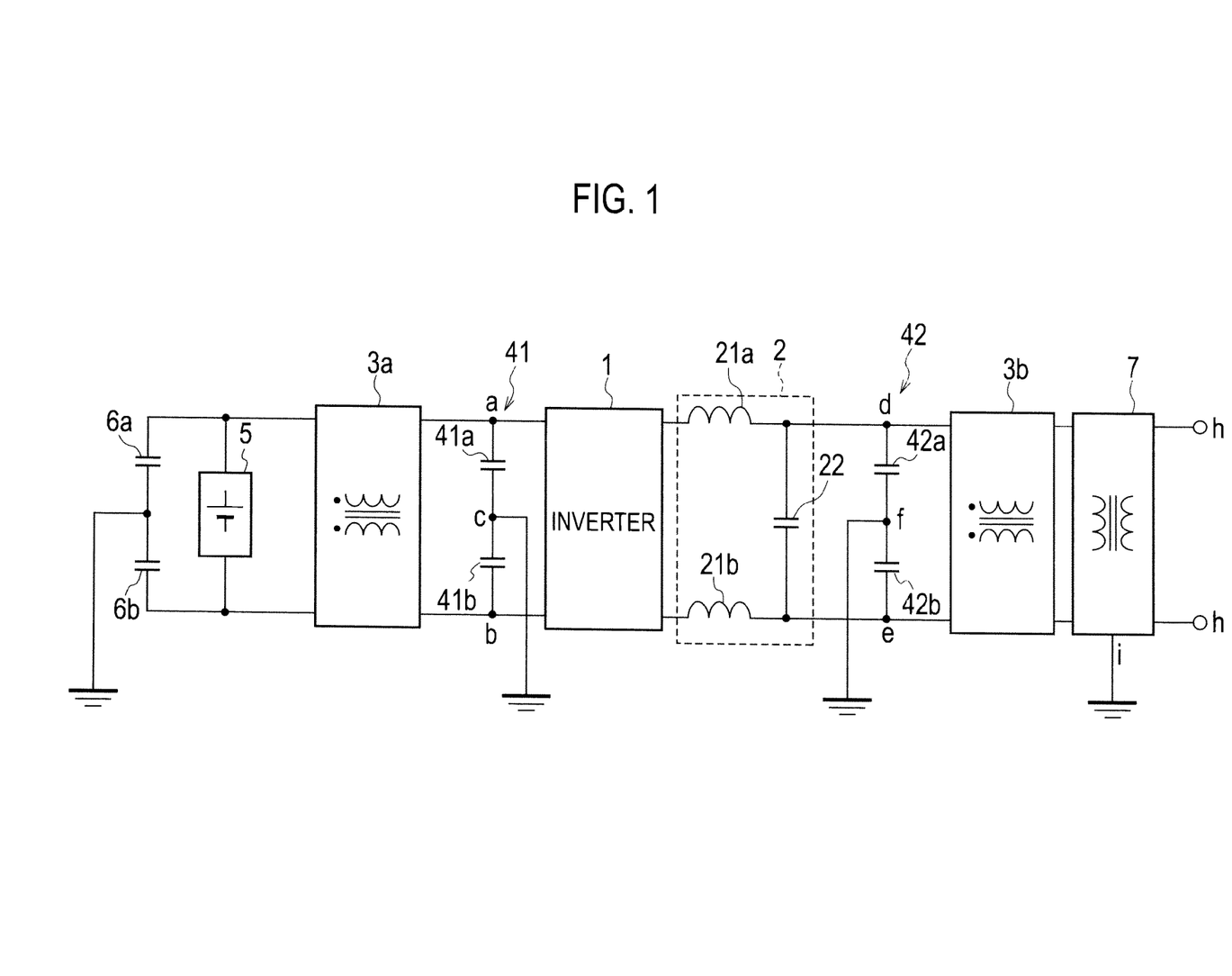
FIG. 1 is a block diagram showing a configuration of a solar power generation system interconnection inverter as a system interconnection inverter applied with a conventional countermeasure against leakage current.

FIG. 1 is a block diagram showing a configuration of a solar power generation system interconnection inverter as a system interconnection inverter applied with a conventional countermeasure against leakage current. The solar power generation system interconnection inverter includes an inverter 1, an output filter 2, a first common mode choke coil 3a, a second common mode choke coil 3b, a first capacitor pair 41, a second capacitor pair 42, a solar cell 5, and a system transformer 7. It is to be noted that floating capacitances between the solar cell 5 and the ground are represented as a capacitor 6a and a capacitor 6b in FIG. 1.

The solar cell 5 generates DC power. The DC power generated by the solar cell 5 is supplied to the inverter 1 through the first common mode choke coil 3a. The first common mode choke coil 3a suppresses a flow of a common mode current from the inverter 1 to the solar cell 5.

The first capacitor pair 41, in which a capacitor 41a and a capacitor 41b are serially connected to each other, is disposed between input terminals a and b of the inverter 1 (between the output terminals of the first common mode choke coil 3a). A DC line positive voltage and a DC line negative voltage respectively appear at the points a and b. A DC line neutral point c, which is connected to the ground, is formed at the connection point of the capacitor 41a and the capacitor 41b.

Figure 2:
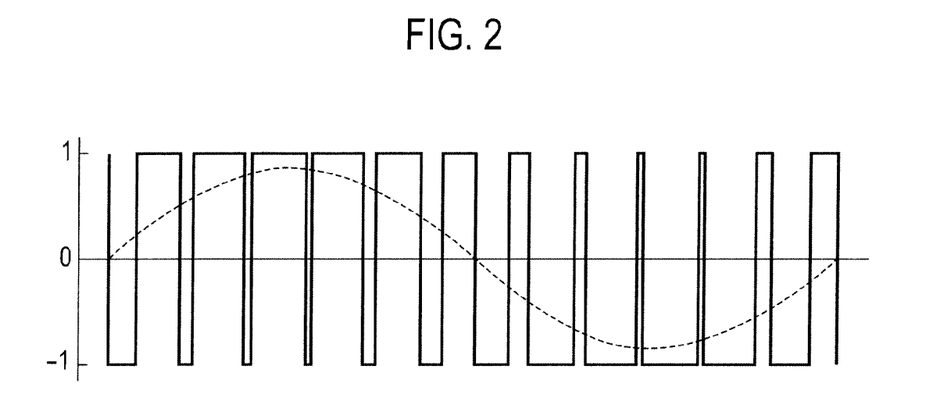
FIG. 2 is a diagram showing a PWM signal outputted when the conventional inverter is driven by a two level PWM control scheme.

The inverter 1 is driven by the two level PWM control scheme. The inverter 1 converts the DC supplied from the solar cell 5 through the first common mode choke coil 3a into a PWM wave as shown in FIG. 2, for example, having amplitude varying from +1 to −1 and having a pulse wave whose pulse widths sequentially change, and transmits the PWM wave to the output filter 2.

The output filter 2 includes a reactor 21a whose input terminal is connected to one of the output terminals of the inverter 1, a reactor 21b whose input terminal is connected to the other output terminal of the inverter 1, and a capacitor 22 connected between the output terminals of the respective reactor 21a and reactor 21b. The output filter 2 converts the PWM signal outputted from the inverter 1 into a sine wave AC as shown in the dashed line in FIG. 2 and transmits the sine wave AC to the system transformer 7 through the second common mode choke coil 3b.

The second capacitor pair 42, in which a capacitor 42a and a capacitor 42b are serially connected to each other, is disposed between input terminals d and e of the second common mode choke coil 3b (between the output terminals of the output filter 2). The sine wave AC (AC output signal) appears between the points d and e. An AC output neutral point f, which is connected to the ground, is formed at the connection point of the capacitor 42a and the capacitor 42b.

The second common mode choke coil 3b suppresses a flow of the common mode current from the output filter 2 to the system transformer 7. The system transformer 7 transforms the sine wave AC supplied from the output filter 2 through the second common mode choke coil 3b and outputs the resultant current through power system terminals h for connection to a power system. The neutral point of the system transformer 7 is connected to the ground through a neutral point grounding wire i.

In the solar power generation system interconnection inverter having the above configuration, a high-frequency leakage current (common mode current) generated in the inverter 1 is prevented from flowing to the solar cell 5 side by the first common mode choke coil 3a, is prevented from flowing to the system transformer 7 side by the second common mode choke coil 3b, and thus flows into the ground by bypassing through the first capacitor pair 41 and the second capacitor pair 42.

Without any countermeasure against leakage current, i.e., without the first common mode choke coil 3a, the second common mode choke coil 3b, the first capacitor pair 41, and the second capacitor pair 42, the leakage current flows through a path of the neutral point grounding wire i of the system transformer 7→the ground→the floating capacitance 6 of the solar cell 5. In contrast, if the solar power generation system interconnection inverter described above drives the inverter 1 by use of the two level PWM control scheme, voltages of opposite polarity are always generated at the output terminals of the inverter 1. Thus, the voltage due to the common mode noise (hereinafter, referred to as common mode voltage) can be suppressed. Furthermore, as described above, the first common mode choke coil 3a suppresses the flow of the leakage current to the solar cell 5, the second common mode choke coil 3b suppresses the flow of the leakage current to the system transformer 7, and the first capacitor pair 41 and the second capacitor pair 42 cause the leakage current to flow into the ground by bypassing.

PRIOR ART DOCUMENT

Patent Document
Patent Document 1: Japanese Patent Application Publication No. 2002-218656
Patent Document 2: Japanese Patent No. 3805953
Non-Patent Document
Non-patent Document 1: "Power Electronics Circuit" compiled by Semiconductor Power Conversion System Investigation Expert Committee of the Institute of Electrical Engineers of Japan, Ohm-sha, November 30th H12, pp 206

SUMMARY OF THE INVENTION

Problems to be Solved by the Invention

However, in the above-described conventional solar power generation system interconnection inverter, the influence of a leakage current on a periphery of the ground into which the leakage current flows by bypassing has to be taken into consideration. Moreover, the output of the inverter 1 driven by the 2 level PWM control scheme has large amplitude as shown in FIG. 2. Thus, the first reactor 21a and the second reactor 21b included in the output filter 2 are large in size. Further, the method of insulation between the solar power generation system interconnection inverter and the power system using the isolation transformer enables thorough elimination of the leakage current. However, the isolation transformer causes reduction in system efficiency and increase in cost by its addition.

Figure 3:
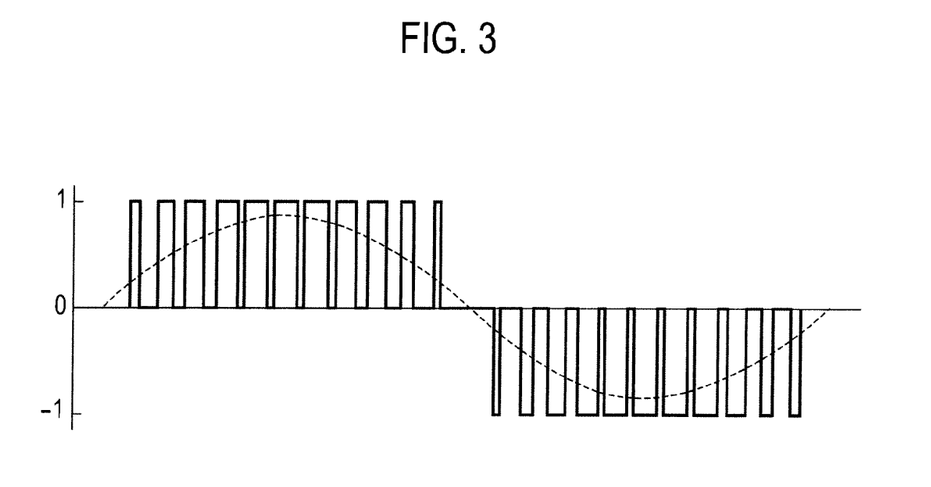
FIG. 3 is a diagram showing a PWM signal outputted when the conventional inverter is driven by a three level PWM control scheme.

Meanwhile, in the inverter 1 driven by a three level PWM control scheme as shown in FIG. 3, the frequency in a single PWM control cycle is doubled and the voltage amplitude is halved compared with those in the two level PWM control scheme. Thus, the voltage ripple is one-fourth of that in the case of the two level PWM control scheme, whereby the first reactor 21a and the second reactor 21b of the output filter 2 can be downsized. However, the inverter 1 driven by the three level PWM control scheme has a problem that the common mode voltage is generated when the output voltage from the inverter 1 is zero, which in turn causes the leakage current.

The present invention provides a system interconnection inverter capable of suppressing the outflow of a leakage current.

Means for Solving the Problems

In order to solve the above problems, a first aspect of the invention includes: an inverter configured to perform pulse wide modulation on an output from a DC power source; a first capacitor pair provided at an input side of the inverter and including two capacitors serially connected to form a neutral point; a second capacitor pair provided at an output side of the inverter and including two capacitors serially connected to forma neutral point; a bypass path for a leakage current formed by connecting the neutral point of the first capacitor pair and the neutral point of the second capacitor pair to each other; at least one common mode choke coil provided between the first capacitor pair and the second capacitor pair and configured to suppress a common mode current generated in the inverter; and an output filter configured to convert a voltage, which is outputted from the inverter and subjected to the pulse wide modulation, into a voltage in a sine wave form.

A second aspect of the invention includes: an inverter configured to perform pulse wide modulation on an output of a DC power source; a first capacitor connected between both terminals of the DC power source; a second capacitor having one terminal connected to an output side of the inverter and another terminal connected to an input side of the inverter and to one terminal of the first capacitor so as to form a bypass path for a leakage current; at least one common mode choke coil provided between points to which the terminals of the second capacitor are respectively connected and configured to suppress a common mode current generated in the inverter; and an output filter configured to covert a voltage, which is outputted from the inverter and subjected to the pulse wide modulation, into a voltage in a sine wave form.

Effects of the Invention

According to the present invention, a bypass path with low impedance for a leakage current is provided on a path extending from the output side to the input side of the inverter in addition to the conventional path for a leakage current. Thus, the outflow of the leakage current can be suppressed even when the inverter is driven by the three level PWM control scheme.

MODES FOR CARRYING OUT THE INVENTION

In the following, embodiments of the present invention are described in detail with reference to the drawings.

Embodiment 1

Figure 4:
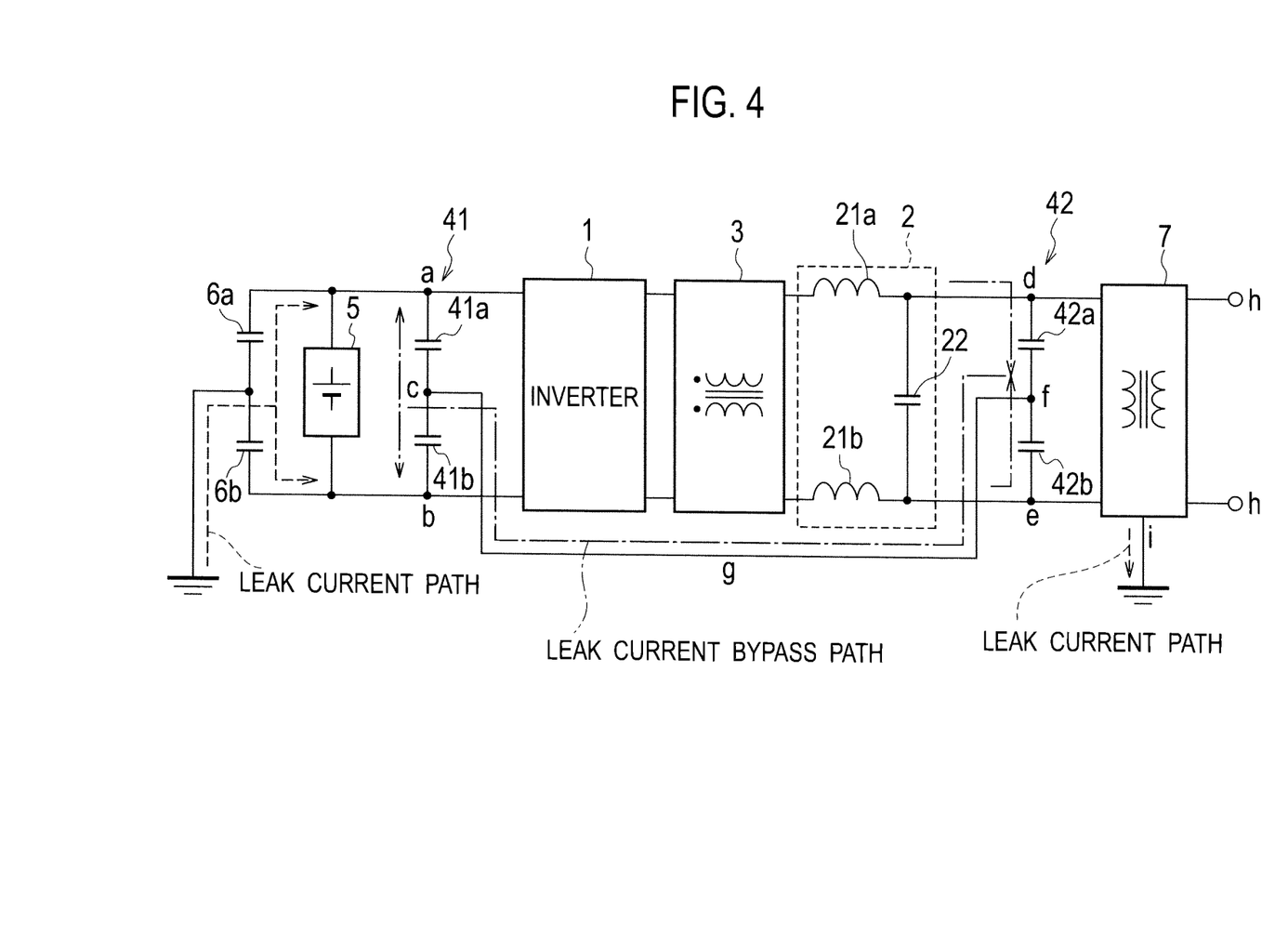
FIG. 4 is a block diagram showing a configuration of a system interconnection inverter according to Embodiment 1 of the present invention.

FIG. 4 is a block diagram showing a configuration of a system interconnection inverter according to Embodiment 1 of the present invention. Note that, in the following, components same as or equivalent to the components of the system interconnection inverter shown in FIG. 1 described in the Background Art section are given the reference numerals same as the reference numerals used in FIG. 1.

The system interconnection inverter includes an inverter 1, an output filter 2, a common mode choke coil 3, a first capacitor pair 41 including a capacitor 41a and a capacitor 41b, a second capacitor pair 42 including a capacitor 42a and a capacitor 42b, a solar cell 5, and a system transformer 7. Note that, in FIG. 4, the floating capacitances between the solar cell 5 and the ground are represented as a capacitor 6a and a capacitor 6b.

The solar cell 5 serving as a DC power source of the present invention generates DC power. The DC power generated by the solar cell 5 is supplied to the inverter 1. It is to be noted that the DC power source of the present invention is not limited to the solar cell; instead, a fuel cell or other cells generating the DC power can be used.

The inverter 1 is formed of a bridge circuit made of a semiconductor element such as a field effect transistor (FET) or an insulated gate bipolar transistor (IGBT). The inverter 1 is driven by a three level PWM control scheme and converts the DC power supplied from the solar cell 5 into a PWM signal as shown in FIG. 3, for example, having amplitude varying from +1 to 0 or from 0 to −1 and having a pulse waveform whose pulse width sequentially changes. The inverter 1 then transmits the PWM signal to the output filter 2 through the common mode choke filter 3.

The common mode choke coil 3 is provided at the output side of the inverter 1 and suppresses the flow of a common mode current from the inverter 1 to the output filter 2.

The output filter 2 includes a reactor 21a whose input terminal is connected to one of the output terminals of the common mode choke coil 3, a reactor 21b whose input terminal is connected to the other output terminal of the common mode choke coil 3, and a capacitor 22 connected between the output terminals of the respective reactor 21a and reactor 21b. The output filter 2 converts the PWM signal transmitted from the inverter 1 through the common mode choke coil 3 into a sine wave AC as shown in the dashed line in FIG. 3 and transmits the sine wave AC to the system transformer 7.

The first capacitor pair 41, in which the capacitor 41a and the capacitor 41b are serially connected to each other, is disposed between input terminals a and b of the inverter 1 (between the output terminals of the solar cell 5). A DC line positive voltage and a DC line negative line voltage respectively appear at the points a and b. A DC line neutral point c is formed at the connection point of the capacitor 41a and the capacitor 41b. A DC line neutral point c is formed at the connection point of the capacitor 41a and the capacitor 41b, and is connected to a later described AC output neutral point f of the second capacitor pair 42 through a neutral point connection wire g.

The second capacitor pair 41, in which the capacitor 42a and the capacitor 42b are serially connected to each other, is disposed between input terminals d and e of the system transformer 7 (between the output terminals of the output filter 2). A sine wave AC (AC output signal) appears between the points d and e. The AC output neutral point f is formed at the connection point of the capacitor 42a and the capacitor 42b. As described above, the AC output neutral point f is connected to the DC line neutral point c of the first capacitor pair 41 through the neutral point connection wire g.

The system transformer 7 transforms the sine wave AC supplied from the output filter 2 and outputs the resultant current through power system terminals h provided for the connection to a power system. The neutral point of the system transformer 7 is connected to the ground through a neutral point grounding wire i.

In the system interconnection inverter having the above configuration, a "leakage current path" is formed, i.e., the leakage current flows through a path of the neutral point grounding wire i of the system transformer 7→the ground→the floating capacitance 6 of the solar cell 5. In addition, a "bypass path g" is formed, i.e., the leakage current flows through a path of the output of the inverter 1→the second capacitor pair 42→the neutral point connection wire g→the first capacitor pair 41→the input of the inverter 1. The bypass path g for the leakage current has impedance sufficiently lower than that of the leakage current path at the frequency of the leakage current (equal to the switching frequency of the inverter 1). The common mode choke coil 3 has impedance higher than those of the leakage current path and the bypass path g.

Thus, most of the leakage current due to the common mode noise flows through the bypass path g and the magnitude thereof is suppressed by the common mode choke coil 3. As a result, the outflow of the leakage current to the outside of the system interconnection inverter is suppressed.

In the system interconnection inverter according to Embodiment 1 of the present invention, the common mode choke coil 3 and the output filter 2 are connected to the output of the inverter 1. Moreover, the AC output neutral point f at the output side of the inverter 1 and the DC line neutral point c at the input side thereof are connected to each other. Thus, the outflow of the leakage current to the outside of the system interconnection inverter can be suppressed.

Embodiment 2

Figure 5:
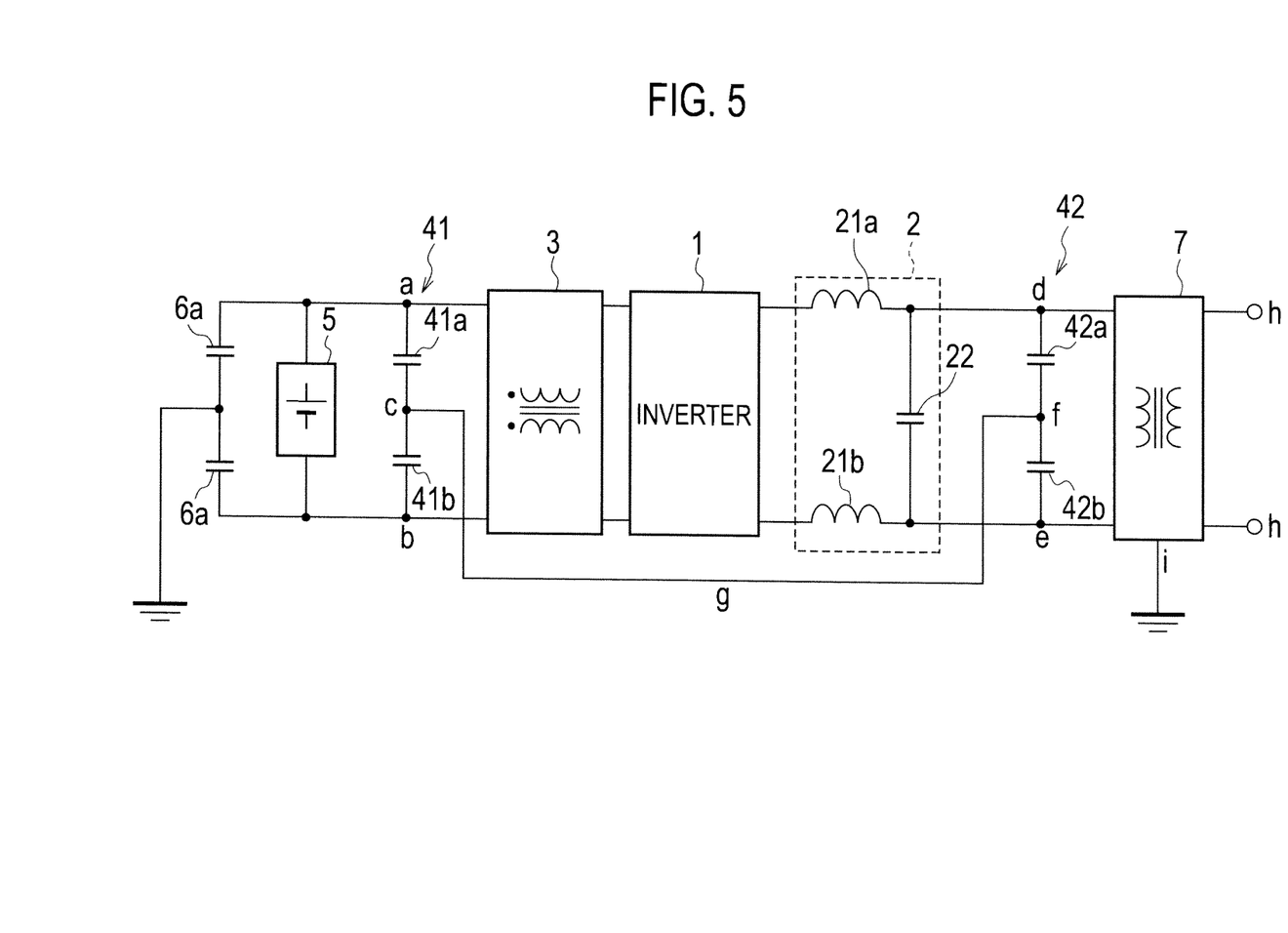
FIG. 5 is a block diagram showing a configuration of a system interconnection inverter according to Embodiment 2 of the present invention.

FIG. 5 is a block diagram showing a configuration of a system interconnection inverter according to Embodiment 2 of the present invention. This system interconnection inverter is different from the system interconnection inverter according to Embodiment 1 in that the common mode choke coil 3 is provided at the input side of the inverter 1.

In the system interconnection inverter, DC power generated by the solar cell 5 is supplied to the inverter 1 through the common mode choke coil 3. The inverter 1 converts the DC power supplied from the solar cell 5 into a PWM signal and transmits the PWM signal to the output filter 2. Other configuration and operations are the same as the configuration and the operations of the system interconnection inverter according to Embodiment 1.

In the system interconnection inverter according to Embodiment 2, the common mode choke coil 3 is disposed at the input side of the inverter 1. In this case also, as in the case of the system interconnection inverter according to Embodiment 1, most of the leakage current due to the common mode noise flows through the bypass path g and the magnitude thereof is suppressed by the common mode choke coil 3. As a result, the outflow of the leakage current to the outside of the system interconnection inverter is suppressed.

Figure 6:
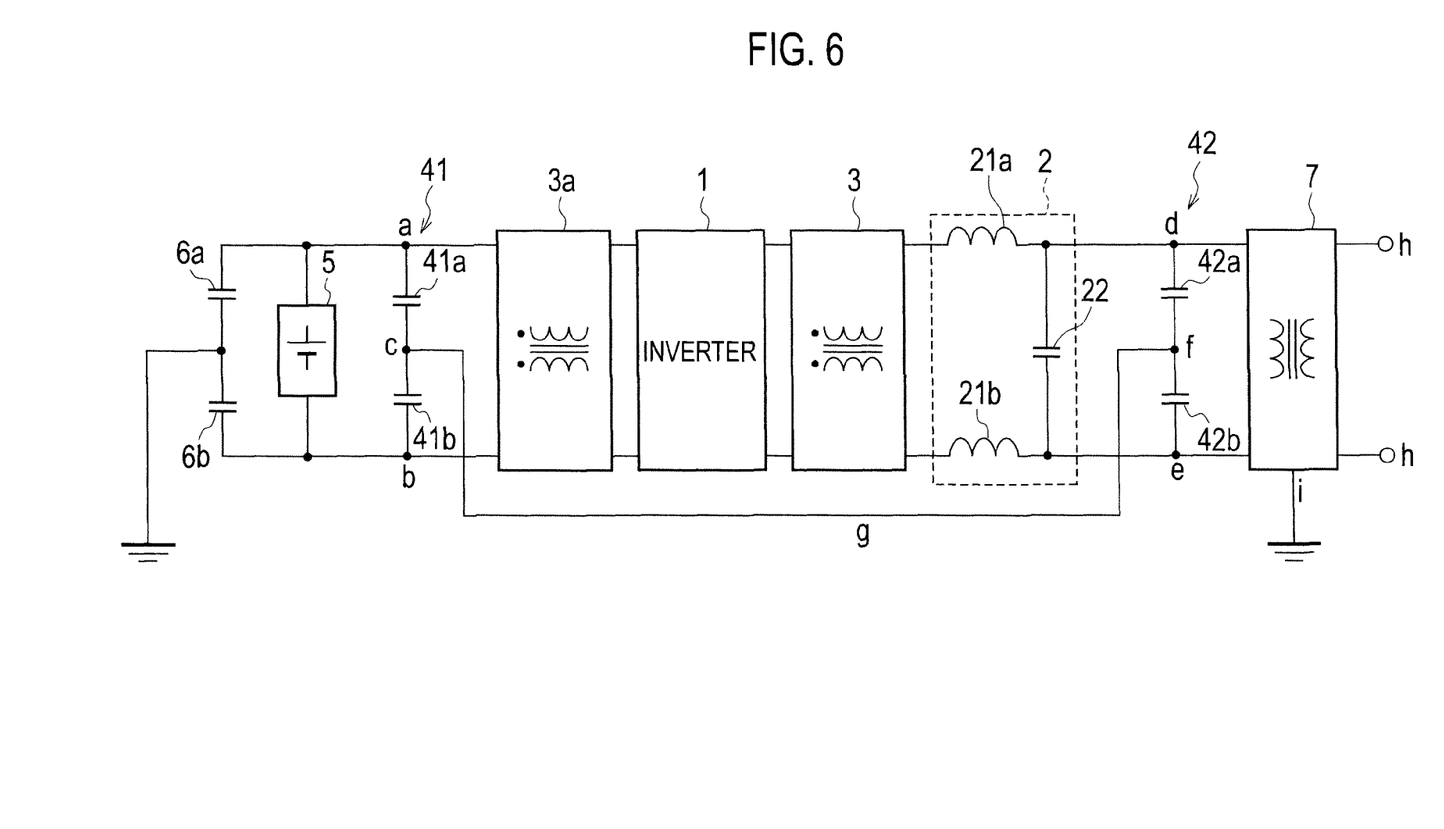
FIG. 6 is a block diagram showing a configuration of a system interconnection inverter according to a modification of Embodiment 2 of the present invention.

In addition, the system interconnection inverter according to Embodiment 2 may have a configuration as shown in FIG. 6, in which a common mode choke coil 3a is additionally provided at the input side of the inverter 1 without removing the common mode choke coil 3 at the output side of the inverter 1. The similar effect as that in Embodiment 2 as described above can also be obtained with such a configuration.

Embodiment 3

Figure 7:
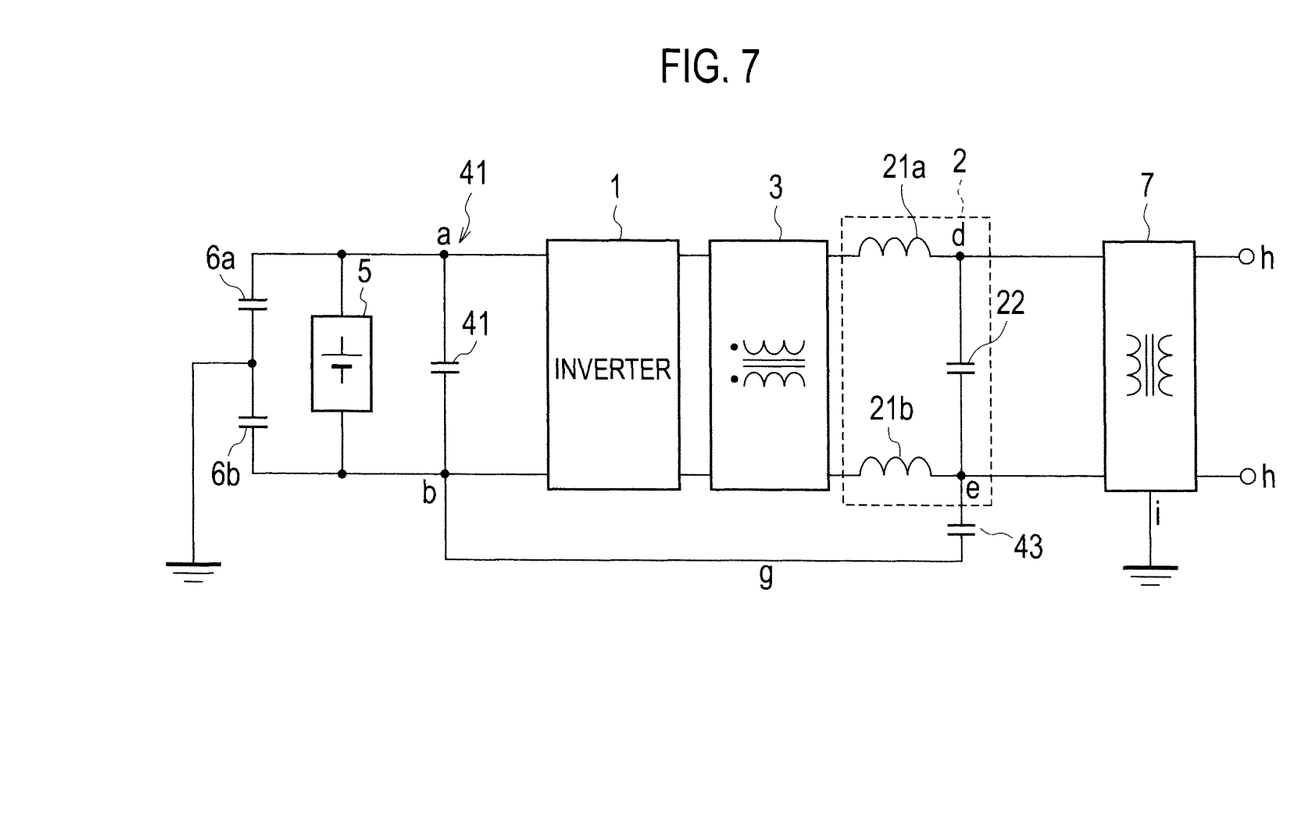
FIG. 7 is a block diagram showing a configuration of a system interconnection inverter according to Embodiment 3 of the present invention.

FIG. 7 is a block diagram showing a configuration of a system interconnection inverter according to Embodiment 3 of the present invention. In this system interconnection inverter, the first capacitor pair 41 in the system interconnection inverter according to Embodiment 1 is replaced with a single capacitor 41 and the second capacitor pair 42 is removed. Furthermore, a capacitor 43 is additionally provided between the output terminal of the output filter 2 on the negative electrode side (point e) and the input terminal of the inverter 1 on the negative electrode side (point b).

In the system interconnection inverter according to Embodiment 1, the bypass path g for the leakage current is formed by connecting the DC line neutral point c formed at the input side of the inverter 1 and the AC output neutral point f formed at the output side thereof to each other. On the other hand, in the system interconnection inverter according to Embodiment 3, the bypass path g is formed by placing the capacitor 43 between the output terminal of the output filter 2 on the negative electrode side (point e) and the input terminal of the inverter 1 on the negative electrode side (point b).

In the system interconnection inverter according to Embodiment 3, the bypass path g is formed by placing the capacitor 43 between the output terminal of the output filter 2 on the negative electrode side (e point) and the input terminal of the inverter 1 on the negative electrode side (b point). In this case also, as in the case of the system interconnection inverter according to Embodiment 1, most of the leakage current due to the common mode noise flows through the bypass path g and the magnitude thereof is suppressed by the common mode choke coil 3. As a result, the outflow of the leakage current to the outside of the system interconnection inverter is suppressed.

Note that, in the system interconnection inverter according to Embodiment 3, the bypass path g is formed by placing the capacitor 43 between the output terminal of the output filter 2 on the negative electrode side (point e) and the input terminal of the inverter 1 on the negative electrode side (point b); alternatively, the bypass path g may be formed by placing the capacitor 43 between the output terminal of the output filter 2 (point d or point e) and the input terminal of the inverter 1 on the positive electrode side (point a).

Furthermore, the bypass path g may be formed by forming the DC line neutral point c at the input side of the inverter 1 as in the system interconnection inverter according to Embodiment 1, and by connecting the DC line neutral point c and the output terminal of the output filter 2 (point d or point e) to each other with the capacitor 43 placed in between. Likewise, the bypass path g may be formed by forming the AC output neutral point f at the output side of the inverter 1, and by connecting the AC output neutral point f and the input terminal of the inverter 1 (point a or point b) to each other with the capacitor 43 placed in between.

Embodiment 4

Figure 8:
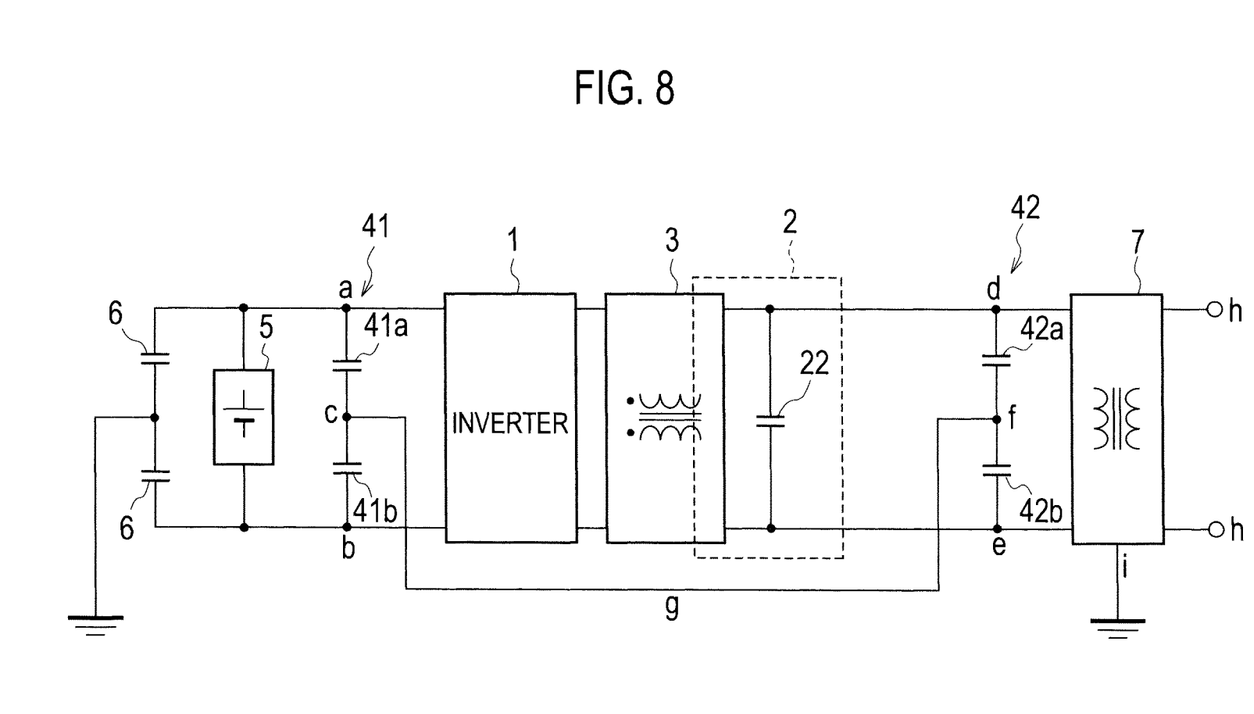
FIG. 8 is a block diagram showing a configuration of a system interconnection inverter according to Embodiment 4 of the present invention.

FIG. 8 is a block diagram showing a configuration of a system interconnection inverter according to Embodiment 4 of the present invention. This system interconnection inverter is configured in such a manner that the reactor 21a and the reactor 21b are removed from the output filter 2 of the system interconnection inverter according to Embodiment 1 and only the capacitor 22 is left therein.

In the system interconnection inverter according to Embodiment 1, the output filter 2 includes the reactor 21a, the reactor 21b, and the capacitor 22. However, a normal mode inductance component included in the common mode choke coil 3 functions similarly as the reactor 21a and the reactor 21b of the output filter 2. Thus, in the system interconnection inverter according to Embodiment 4, the normal mode inductance component in the common mode choke coil 3 is substituted for the reactor 21a and the reactor 21b of the output filter 2. In addition, the normal mode inductance component can be adjusted through the designing of the shape of an iron core.

With the system interconnection inverter according to Embodiment 4, the outflow of a leakage current to the outside of the system interconnection inverter is suppressed as in the system interconnection inverter according to Embodiment 1. In addition, the low-cost and small-sized system interconnection inverter can be provided because the reactor 21a and the reactor 21b for forming the output filter 2 are not required.

Embodiment 5

Figure 9:
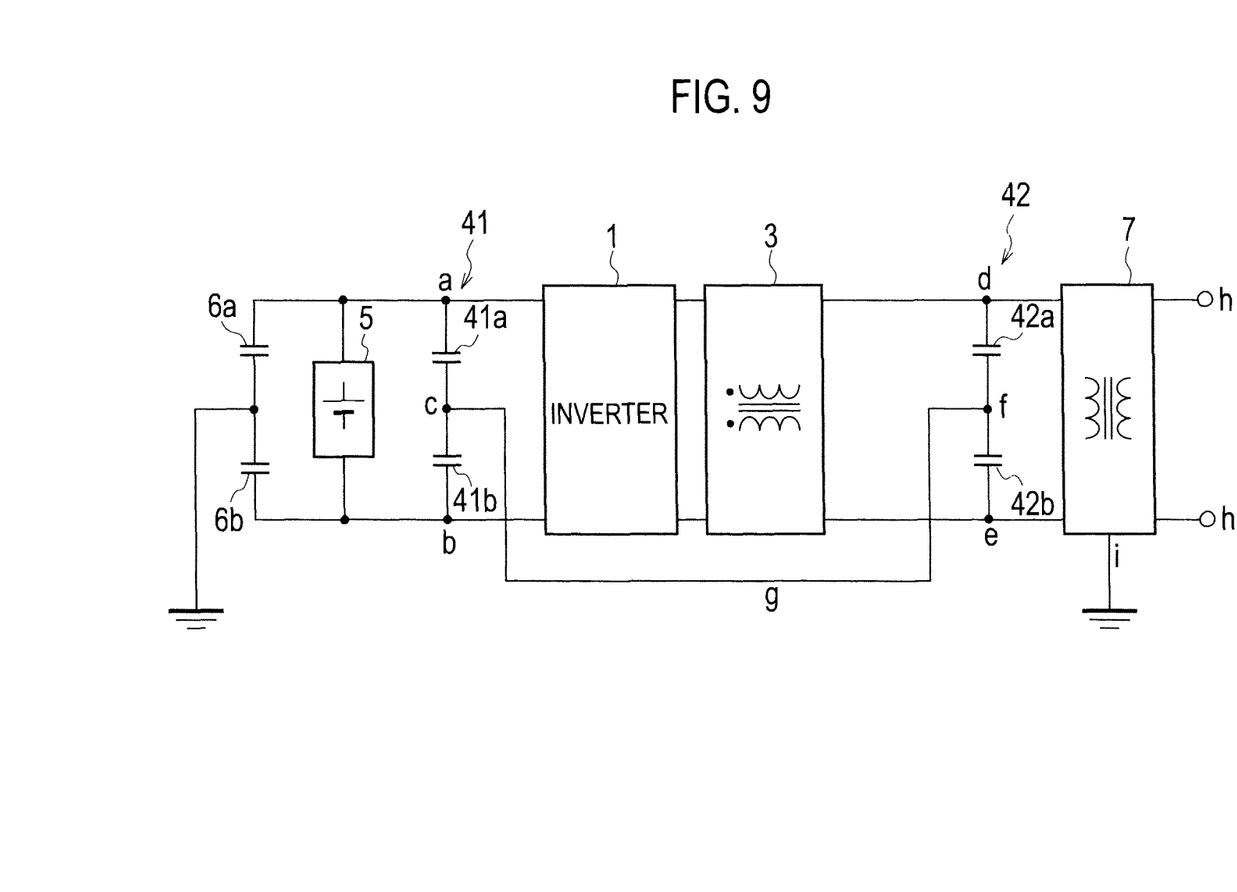
FIG. 9 is a block diagram showing a configuration of a system interconnection inverter according to Embodiment 5 of the present invention.

FIG. 9 is a block diagram showing a configuration of a system interconnection inverter according to Embodiment 5 of the present invention. This system interconnection inverter is configured in such a manner that the output filter 2 is removed from the system interconnection inverter according to Embodiment 1.

In the system interconnection inverter according to Embodiment 1, the output filter 2 includes the reactor 21a, the reactor 21b, and the capacitor 22. However, a normal mode inductance component included in the common mode choke coil 3 can serve as the reactor 21a and the reactor 21b of the output filter 2. Furthermore, the capacitance of the second capacitor pair 42 forming the neutral point can serve as the capacitor 22 of the output filter 2.

Thus, the function of the output filter 2 can be implemented by appropriately adjusting the normal mode inductance component of the common mode choke coil 3 and the capacitances of the capacitor 42a and the capacitor 42b forming the second capacitor pair 42. Accordingly, the second capacitor pair 42 itself can be removed.

With the system interconnection inverter according to Embodiment 5, the outflow of a leakage current to the outside of the system interconnection inverter is suppressed as in the system interconnection inverter according to Embodiment 1. In addition, the lower-cost and smaller-sized system interconnection inverter than the system interconnection inverter according to Embodiment 4 can be provided because the reactor 21a, the reactor 21b, and the capacitor 22 for forming the output filter 2 are not required.

Note that, in the system interconnection inverter according to Embodiment 5, only the second capacitor pair 42 may be substituted for the capacitor 22 without removing the reactor 21a and the reactor 21b of the output filter 2.

Embodiment 6

Figure 10:
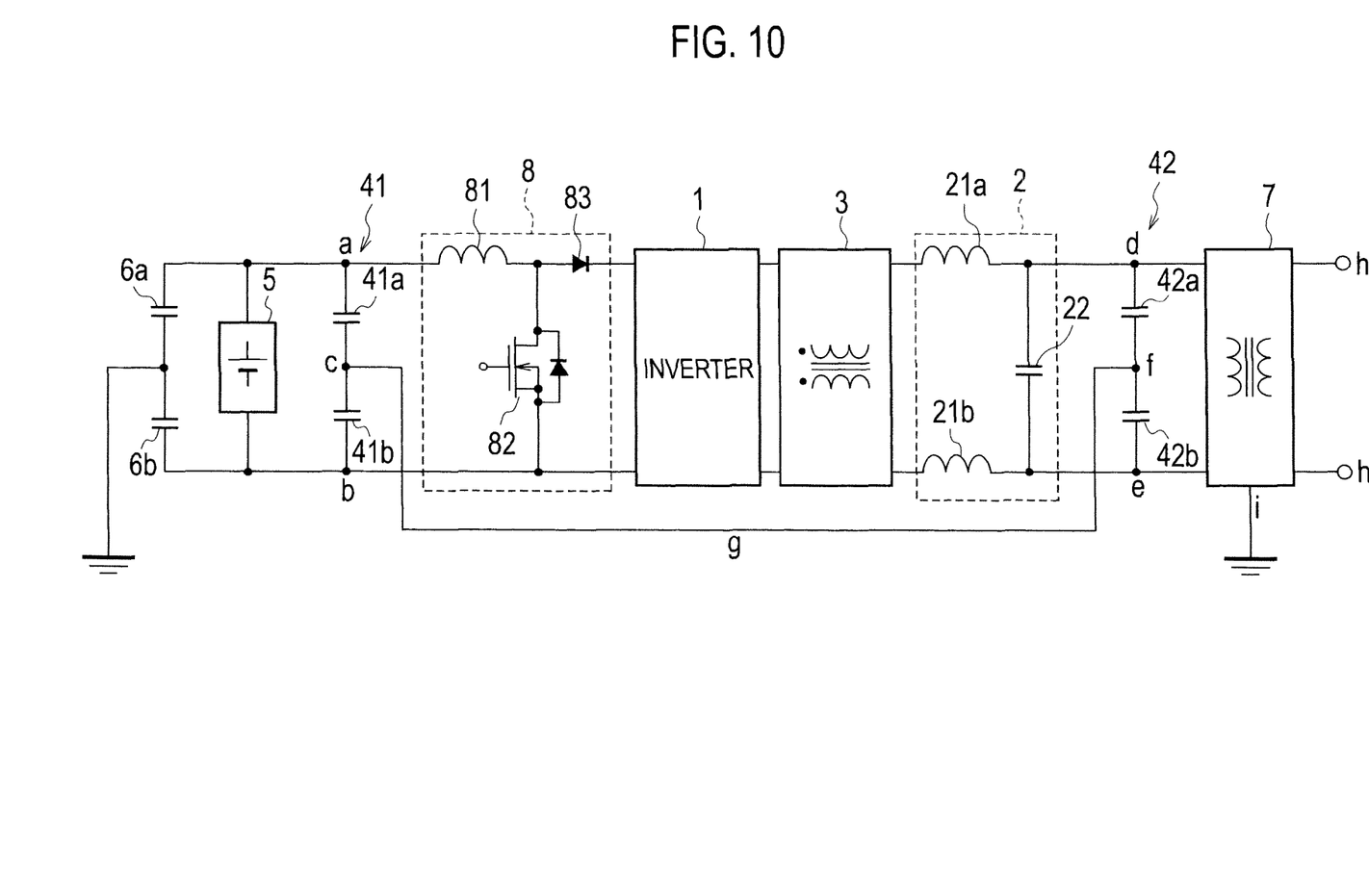
FIG. 10 is a block diagram showing a configuration of a system interconnection inverter according to Embodiment 6 of the present invention.

FIG. 10 is a block diagram showing a configuration of a system interconnection inverter according to Embodiment 6 of the present invention. This system interconnection inverter is configured in such a manner that a booster circuit 8 is additionally provided at the input side of the inverter 1 of the system interconnection inverter according to Embodiment 1.

The booster circuit 8 includes a reactor 81, a switching element 82, and a diode 83. One terminal of the reactor 81 is connected to a positive terminal of the solar cell 5 while the other terminal is connected to the anode of the diode 83. The cathode of the diode 83 is connected to the input terminal of the inverter 1 on the positive electrode side. Further, the switching element 82 is formed of an FET for example, and has its drain and source respectively connected to a connection point of the reactor 81 and the diode 83 and the negative terminal of the solar cell 5. This booster circuit 8 boosts power outputted from the solar cell 5 and transmits the resultant power to the inverter 1.

With the system interconnection inverter according to Embodiment 6, the outflow of the leakage current to the outside of the system interconnection inverter is suppressed as in the case of the system interconnection inverter according to Embodiment 1.

Embodiment 7

Figure 11:
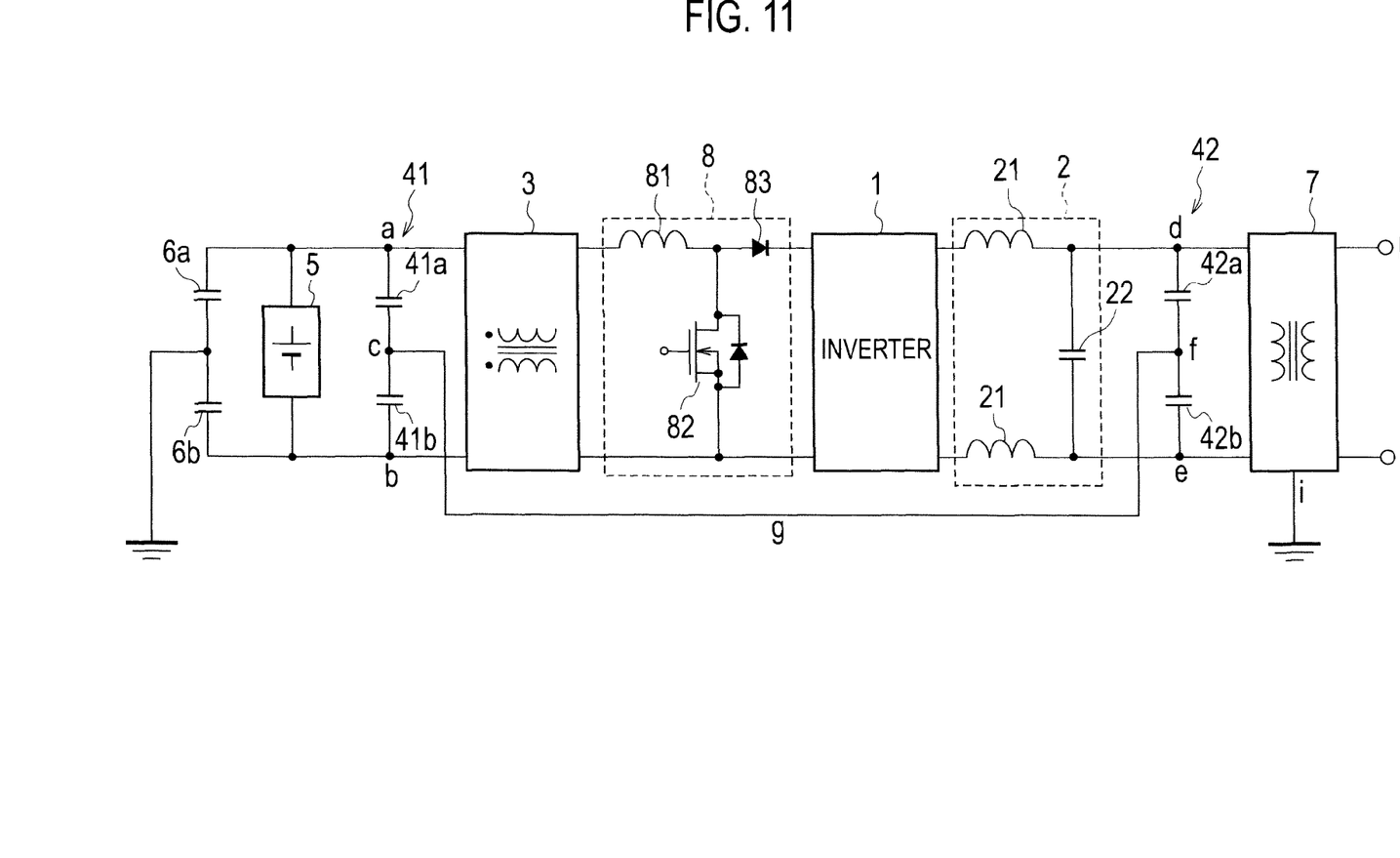
FIG. 11 is a block diagram showing a configuration of a system interconnection inverter according to Embodiment 7 of the present invention.

FIG. 11 is a block diagram showing a configuration of a system interconnection inverter according to Embodiment 7 of the present invention. This system interconnection inverter is different from the system interconnection inverter according to Embodiment 6 in that the common mode choke coil 3 is provided at the input side of the booster circuit 8 and on the subsequent stage of the first capacitor pair 41.

In this system interconnection inverter, the DC power generated by the solar cell 5 is supplied to the booster circuit 8 through the common mode choke coil 3, boosted by the booster circuit 8, and then supplied to the inverter 1. The inverter 1 converts the boosted DC power supplied from the booster circuit 8 into a PWM signal and transmits the PWM signal to the output filter 2. Other configuration and operations are same as the configuration and the operations of the system interconnection inverter according to Embodiment 6.

With the system interconnection inverter according to Embodiment 7, the outflow of the leakage current to the outside of the system interconnection inverter is suppressed as in the case of the system interconnection inverter according to Embodiment 1.

Figure 12:
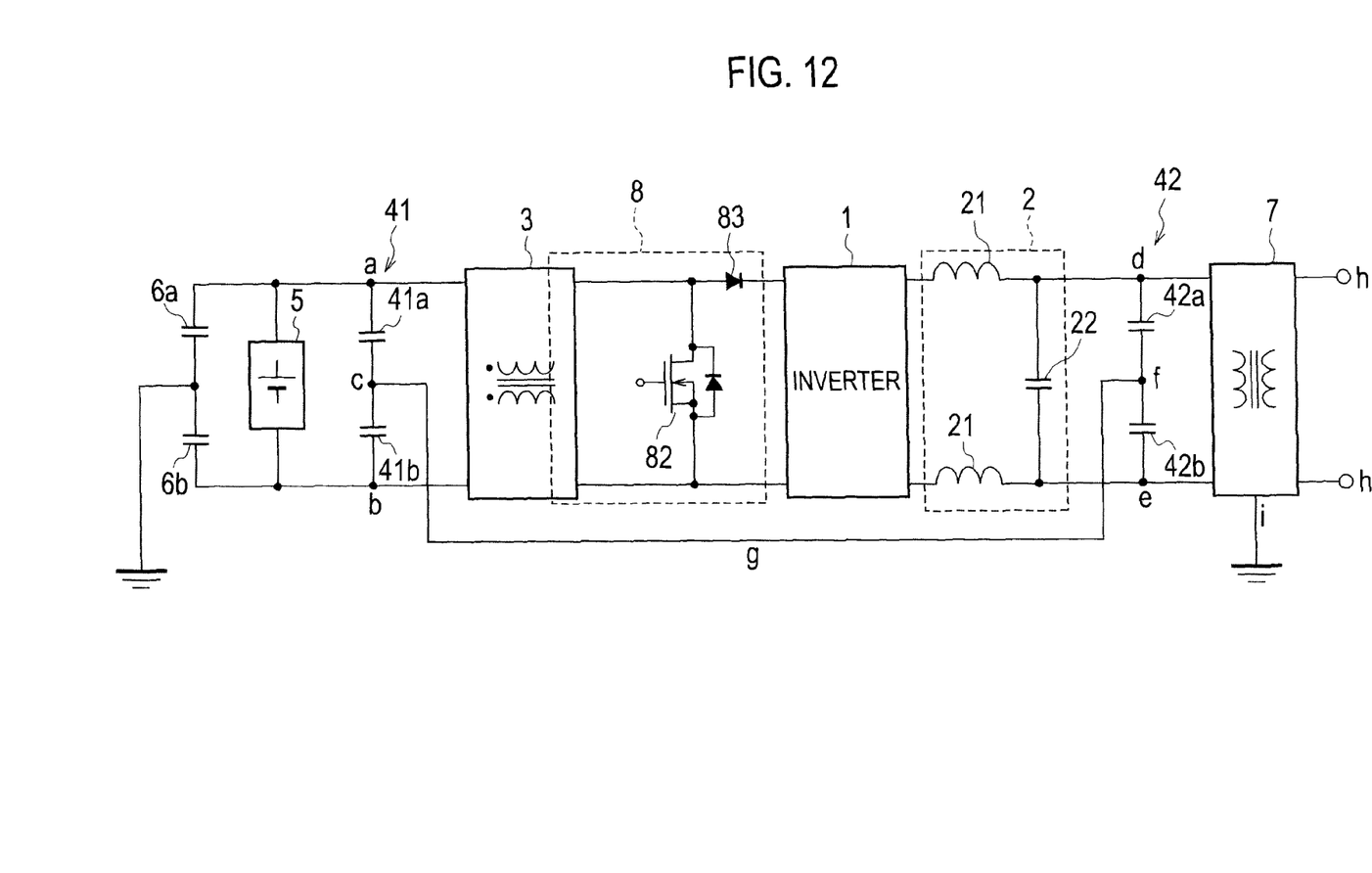
FIG. 12 is a block diagram showing a configuration of a system interconnection inverter according to a modification of Embodiment 7 of the present invention.

It is to be noted that a normal inductance component of the common mode choke coil 3 can serve as the reactor 81 of the booster circuit 8. Thus, the system interconnection inverter according to Embodiment 7 may be modified in such a manner that the normal mode inductance component of the common mode choke coil 3 is substituted for the reactor 81 of the booster circuit 8 as shown in FIG. 12. A leak inductance component can be used as the normal mode inductance component. The normal mode inductance component may also be generated by the designing of the shape of the iron core and the like. With the system interconnection inverter according to this modification, the lower-cost and smaller-sized system interconnection inverter than the system interconnection inverter according to Embodiment 7 can be provided because the reactor 81 for forming the booster circuit 8 is not required.

It is to be noted that the present invention is not limited to the system interconnection inverters according to Embodiments 1 to 7.

For example, the capacitors 41 and 43 shown in FIG. 7 can be applied to the system interconnection inverters shown in FIG. 5, FIG. 6, FIG. 8, FIG. 9, FIG. 10, FIG. 11, and FIG. 12. More specifically, in FIG. 5, FIG. 6, FIG. 8, FIG. 9, FIG. 10, FIG. 11, and FIG. 12, the capacitors 41a and 41b may be replaced with the capacitor 41 shown in FIG. 7, the capacitor 42a and the capacitor 42b may be removed, and the capacitor 43 maybe additionally provided between the output terminal of the output filter 2 on the negative electrode side (point e) and the input terminal thereof (point b).

INDUSTRIAL APPLICABILITY

The present invention can be used as a system interconnection inverter that connects a solar cell system or a fuel cell system to a power system.

EXPLANATION OF REFERENCE NUMERALS 1 inverter
2 output filter
3, 3a common mode choke coil
5 solar cell
6a, 6b floating capacitance
7 system transformer
8 booster circuit
21a, 21b reactor
22 capacitor
41 first capacitor pair
41a, 41b capacitor
42 second capacitor pair
42a, 42b capacitor
43 capacitor

The invention claimed is:

1. A system interconnection inverter comprising:
an inverter configured to perform pulse wide modulation on an output from a DC power source;
a first capacitor pair provided at an input side of the inverter and including two capacitors serially connected to form a neutral point;
a second capacitor pair provided at an output side of the inverter and including two capacitors serially connected to form a neutral point;
a bypass path for a leakage current formed by connecting the neutral point of the first capacitor pair and the neutral point of the second capacitor pair to each other;
at least one common mode choke coil provided between the first capacitor pair and the second capacitor pair and configured to suppress a common mode current generated in the inverter; and
an output filter configured to convert a voltage, which is outputted from the inverter and subjected to the pulse wide modulation, into a voltage in a sine wave form, wherein
the bypass path includes impedance smaller than a leakage current path through which the leakage current flows into a floating capacitance of the DC power source through a ground from a system transformer connected through the second capacitor pair in the switching frequency of the inverter, the common mode choke coil includes bigger impedance than the leakage current path and the bypass path.

2. The system interconnection inverter according to claim 1, wherein the output filter includes:
a normal mode inductance component of the common mode choke coil; and
a capacitor connected between output terminals of the common mode choke coil.

3. The system interconnection inverter according to claim 1, wherein the output filter includes a capacitance of the second capacitor pair connected between output terminals of the common mode choke coil.

4. The system interconnection inverter according to claim 1, Further comprising a booster circuit configured to boost an output voltage of the DC power source, wherein
the inverter performs the pulse wide modulation on an output of the booster circuit.

5. The system interconnection inverter according to claim 4, wherein
at least one of the common mode choke coils is provided at an input side of the booster circuit, and
the booster circuit includes:
a normal mode inductance component of the common mode choke coil;
a diode connected to one of output terminals of the common mode choke coil; and
a switching element provided between both the output terminals of the common mode choke coil.

6. A system interconnection inverter comprising:
an inverter configured to perform pulse wide modulation on an output of a DC power source;
a first capacitor connected between both terminals of the DC power source;
a second capacitor having one terminal connected to an output side of the inverter and another terminal connected to one terminal of the first capacitor so as to form a bypass path for a leakage current;
at least one common mode choke coil provided between points to which the terminals of the second capacitor are respectively connected and configured to suppress a common mode current generated in the inverter; and
an output filter configured to convert a voltage, which is outputted from the inverter and subjected to the pulse wide modulation, into a voltage in a sine wave form, wherein
the bypass path includes impedance smaller than a leakage current path through which the leakage current flows into a floating capacitance of the DC power source through a ground from a system transformer connected through the second capacitor pair in the switching frequency of the inverter, the common mode choke coil includes bigger impedance than the leakage current path and the bypass path.

7. The system interconnection inverter according to claim 6, wherein the output filter includes:
a normal mode inductance component of the common mode choke coil; and
a capacitor connected between output terminals of the common mode choke coil.

8. The system interconnection inverter according to claim 6, wherein the output filter includes a capacitance of the second capacitor pair connected between output terminals of the common mode choke coil.

9. The system interconnection inverter according to claim 6 further comprising a booster circuit configured to boost an output voltage of the DC power source, wherein
the inverter performs the pulse wide modulation on an output of the booster circuit.

10. The system interconnection inverter according to claim 9, wherein
at least one of the common mode choke coils is provided at an input side of the booster circuit, and
the booster circuit includes:
a normal mode inductance component of the common mode choke coil;
a diode connected to one of output terminals of the common mode choke coil; and
a switching element provided between both the output terminals of the common mode choke coil.

* * * * *